United States Patent [19]

Armbrust et al.

[11] Patent Number: 4,923,209
[45] Date of Patent: May 8, 1990

[54] WHEEL SUSPENSION FOR A POWERED FRONT AXLE OF A MOTOR VEHICLE

[75] Inventors: Eberhard Armbrust, Renningen; Hans-Juergen Woehler, Hemmingen, both of Fed. Rep. of Germany

[73] Assignee: Dr. Ing. h.c.F. Porsche AG, Fed. Rep. of Germany

[21] Appl. No.: 307,954

[22] Filed: Feb. 9, 1989

[30] Foreign Application Priority Data

Feb. 9, 1988 [DE] Fed. Rep. of Germany ....... 3803802

[51] Int. Cl.$^5$ ............................................. B60G 11/50
[52] U.S. Cl. ..................................... 280/689; 280/696
[58] Field of Search ............... 280/689, 691, 695, 700, 280/723, 696

[56] References Cited

U.S. PATENT DOCUMENTS 4,153,272  5/1979  Fiedler et al. ...................... 280/689
4,703,947  11/1987  Tattermusch ....................... 280/700

Primary Examiner—Charles A. Marmor
Assistant Examiner—Karin Tyson
Attorney, Agent, or Firm—Evenson, Wands, Edwards, Lenahan & McKeown

[57] ABSTRACT

A wheel suspension for a powered front axle of a motor vehicle comprises a stabilizer held at the body which, via a joint, is connected with a suspension gear linkage and, via another joint, is connected with a wheel carrier. The suspension linkage consists of an arm which is constructed in the shape of a semicircle, is adjusted in longitudinal direction of the vehicle and the one joint of which, on the wheel carrier side, is arranged above an axis of rotation of the wheel, in an axis of inclination formed by an upper spring strut support bearing and a lower transverse link bearing. The arm, between the two joints, forms a semicircular clearance for a transversely extending wheel drive shaft which extends at a distance from the arm in vertical and longitudinal direction.

11 Claims, 1 Drawing Sheet

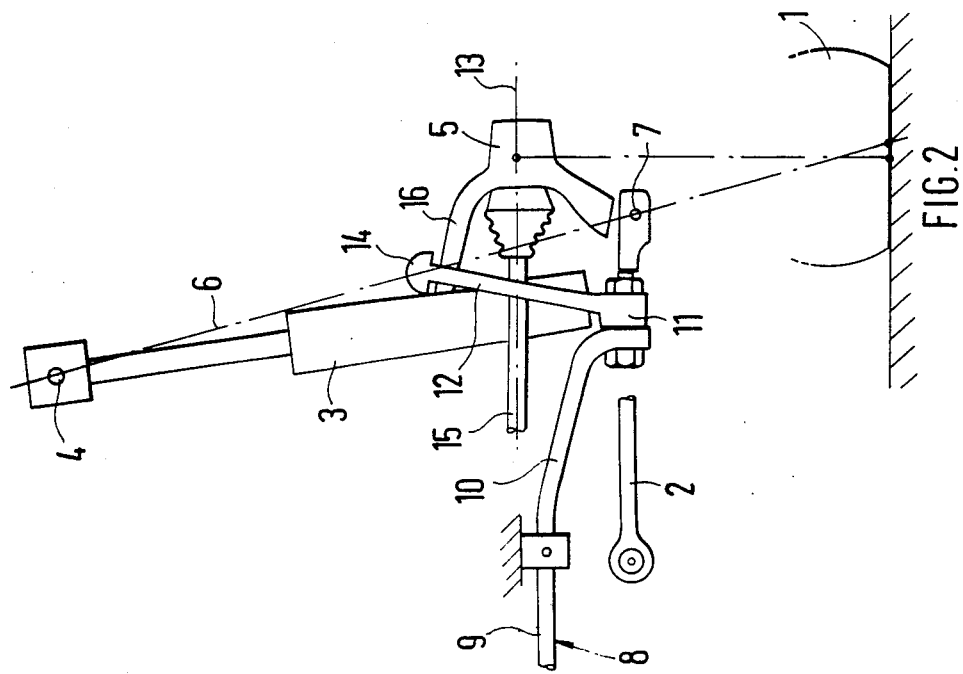
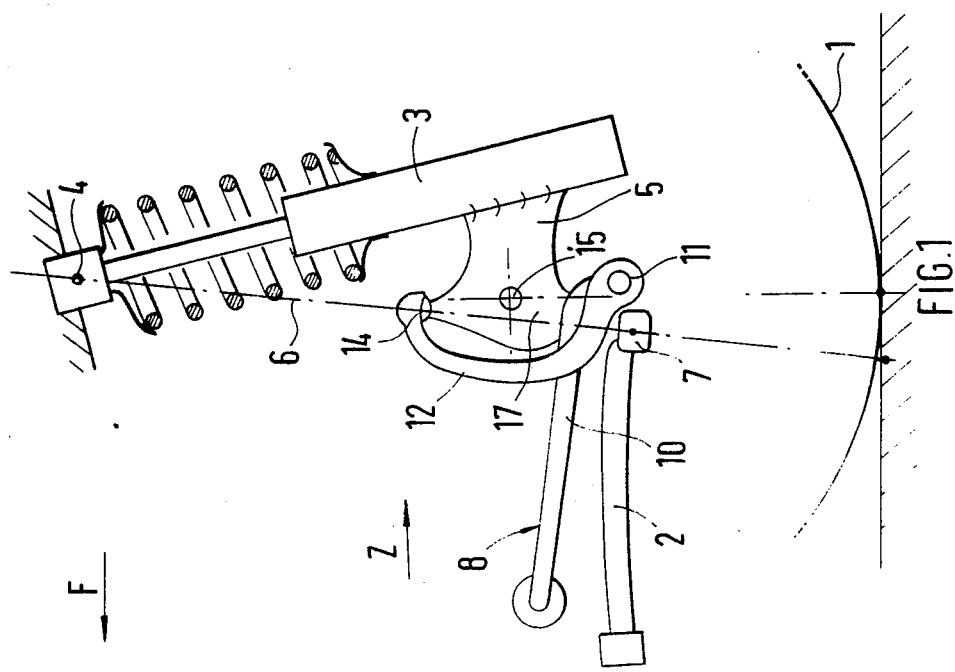

WHEEL SUSPENSION FOR A POWERED FRONT AXLE OF A MOTOR VEHICLE

BACKGROUND AND SUMMARY OF THE INVENTION

The relates to a wheel suspension for a powered front axle of a motor vehicle, having a stabilizer held at the body which is connected with a suspension linkage by means of a joint and with a wheel carrier by means of another joint.

From US-PS 41 53 272, a wheel suspension is known which has a stabilizer for a nonpowered front axle, the straight suspension gear or linkage of this stabilizer being pivotally connected at the wheel carrier at a distance from the axis of inclination of the wheel.

It is an object of the invention to provide a wheel suspension for a powered front axle of a motor vehicle having a stabilizer which is not influenced by the swivel movements of the wheel, for example, during steering, and ensures an unimpaired course of the wheel drive shaft.

According to the invention, this object is achieved by providing an arrangement wherein the suspension linkage comprises an arm constructed as a semicircle which extends in the longitudinal direction of the vehicle and one joint of which is arranged on the wheel carrier side above an axis of rotation of the wheel in an axis of inclination formed by an upper spring strut support bearing and a lower transverse link bearing. Other advantageous characteristics are contained in the preferred embodiments of the invention.

The main advantages which are achieved by the invention are that, despite a position of the two joints of the suspension linkage in a plane, which leads through the drive shaft, this drive shaft is to be arranged, unimpaired by the suspension linkage so that it extends transversely with respect to the wheel. This possibility is provided by means of a suspension linkage which consists of an arm which, shaped like a semicircle, in the manner of a crescent, extends around the drive shaft. Thus, a first upper pivotal point of the arm at the wheel carrier may be located in the axis of inclination of the wheel which is formed by an upper spring strut support bearing and a lower link bearing.

The second lower pivotal point of the arm—with respect to the driving direction—is located behind the axis of inclination and at the farthest possible distance to the upper joint, so that a suspension linkage arm with the largest possible length is obtained.

Other objects, advantages and novel features of the present invention will become apparent from the following detailed description of the invention when considered in conjunction with the accompanying drawings.

BRIEF DESCRIPTION OF THE DRAWINGS

FIG. 1 is a lateral schematic view of a vehicle wheel having a stabilizer, a spring strut and a wheel suspension link, constructed in accordance with a preferred embodiment of the invention;

FIG. 2 is a view taken in the direction of the arrow Z of FIG. 1.

DETAILED DESCRIPTION OF THE DRAWINGS

FIG. 1 shows a powered front wheel 1 of a motor vehicle, which is guided by means of a lower link 2 and a spring strut 3. By means of an upper support bearing 4, this spring strut 3 is disposed at the body and connected with the wheel carrier 5. A connecting line 6 between the upper support bearing 4 and a lower link bearing 7 at the wheel carrier forms an axis of inclination for the wheel around which, during steering, it carries out a swivelling movement.

Between the front wheels 1 of the vehicle, a stabilizer 8 is held which is supported at the body. This stabilizer comprises a rod 9 with ends 10, which are bent at right angles and, at their ends, are connected with suspension linkage 12 by means of lower joints 11. These are disposed at the wheel carrier 5 in other joints, which are arranged above the axis of rotation 13 of the wheel.

The suspension linkage comprises an arm 12, which is bent in the shape of a semicircle in the manner of a crescent and extends in longitudinal direction of the vehicle (FIG. 1) and extends in such a manner around the drive shaft 15 at a distance forming a clearance 17 that the upper joint 14 is located in the axis 6 of inclination of the wheel 1, and the other lower joint 11—with respect to the driving direction F —is located behind the drive shaft 15 or behind the axis 6 of inclination.

The upper joint 14 of the arm 12 is arranged in a projecting bracket 16 of the wheel carrier 5 and consists preferably of a standing ball-and-socket joint. In contrast, the lower joint 11 is formed by a rubber metal joint which is held at the end of part 10 of rod 9, which is bent at right angles.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A suspension for supporting a driven front wheel and wheel carrier on a vehicle body, said suspension comprising:
    a stabilizer mounted to the vehicle body;
    a suspension linkage having one end connected to the stabilizer by means of a first joint and another end connected to the wheel carrier by means of a second joint, wherein the suspension linkage comprises an arm having a semicircular shape and which extends in the longitudinal direction of the vehicle;
    a lower transverse link having one end connected to the wheel carrier by means of a bearing and another end connected to the vehicle body and
    a spring strut mounted to the vehicle body at an upper end thereof by means of an upper spring strut bearing and a lower end mounted to the wheel carrier,
    wherein the first joint is located above an axis of rotation of the wheel and an axis of inclination formed by the upper spring strut support bearing and the lower transverse link bearing.

2. A wheel suspension according to claim 1, wherein the arm forms a semicircular clearance between the two joints for accommodating a transversely extending wheel drive shaft which extends at a distance from the arm in both a vertical and longitudinal direction.

3. A wheel suspension according to claim 1, wherein the lower joint of the arm is located behind the link bearing with respect to the forward direction (F) and is located approximately at the level of the link, the lower joint being located at a changing distance from the link bearing in the whole suspension range.

4. A wheel suspension according to claim 1, wherein the joint between the arm and the wheel carrier consists of a ball-and-socket joint which is held in a bracket of the wheel carrier which projects toward the interior.

5. A wheel suspension according to claim 2, wherein the joint between the arm and the wheel carrier consists of a ball-and-socket joint which is held in a bracket of the wheel carrier which projects toward the interior.

6. A wheel suspension according to claim 3, wherein the joint between the arm and the wheel carrier consists of a ball-and-socket joint which is held in a bracket of the wheel carrier which projects toward the interior.

7. A wheel suspension according to claim 1, wherein the joint between the arm and a transversely extending rod of the stabilizer consists of a rubber metal joint which is held at the end of a bent-away end part of the rod and—with respect to the driving direction F—is arranged behind a wheel drive shaft.

8. A wheel suspension according to claim 2, wherein the joint between the arm and a transversely extending rod of the stabilizer consists of a rubber metal joint which is held at the end of a bent-away end part of the rod and—with respect to a driving direction F—is arranged behind the wheel drive shaft.

9. A wheel suspension according to claim 3, wherein the joint between the arm and the transversely extending rod of the stabilizer consists of a rubber metal joint which is held at the end of a bent-away end part of the rod and—with respect to the driving direction F—is arranged behind a wheel drive shaft.

10. A wheel suspension according to claim 4, wherein the joint between a arm and the transversely extending rod of the stabilizer consists of a rubber meal joint which is held at the end of a bent-away end part of the rod and—with respect to the driving direction F—is arranged behind a wheel drive shaft.

11. A wheel suspension according to claim 6, wherein a joint between the arm and the transversely extending rod of the stabilizer consists of a rubber metal joint which is held at the end of a bent-away end part of the rod and—with respect to the driving direction F—is arranged behind a wheel drive shaft.

* * * * *